(12) United States Patent
Kessler et al.

(10) Patent No.: US 6,621,528 B1
(45) Date of Patent: Sep. 16, 2003

(54) CHANNEL CONTROL FOR DIGITAL TELEVISION

(75) Inventors: Damien Kessler, San Jose, CA (US); David McNamara, Fremont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/576,878

(22) Filed: May 22, 2000

(51) Int. Cl.[7] .................................................. H04N 5/44
(52) U.S. Cl. .......................................... 348/734; 725/38
(58) Field of Search ................................ 348/731, 553, 348/714, 725; 725/38, 56, 61

(56) References Cited

U.S. PATENT DOCUMENTS 5,600,378 A * 2/1997 Wasilewski .................. 348/468
6,137,539 A * 10/2000 Lownes et al. ............. 348/569
6,313,886 B1 * 11/2001 Sugiyama ................... 348/731
6,473,129 B1 * 10/2002 Choi .......................... 348/465
6,483,547 B1 * 11/2002 Eyer .......................... 348/473

* cited by examiner

Primary Examiner—Victor R. Kostak
(74) Attorney, Agent, or Firm—Miller Patent Services; Jerry A. Miller (57) ABSTRACT

A digital television autoprogramming and tuning method and apparatus. In a digital television which can tune both MPEG 2 and PSIP format signals, a method of tuning uses one or more tables of information populated during an autoprogramming process. For MPEG 2 channels, the physical channel equals the major channel number and can be directly tuned. For PSIP channels, the major channel indexes a TSID which is used to determine a physical channel. If the TSID does not correspond to the correct program, the correct TSID is determined from the Program Specific Information in the data transport stream 134 and the system re-tunes to the correct physical channel. The autoprogramming process sequentially steps through each physical channel and populates the autoprogramming tables with information about each channel it finds, saving only a single TSID for a given major PSIP channel.

24 Claims, 8 Drawing Sheets

CHANNEL CONTROL FOR DIGITAL TELEVISION

FIELD OF THE INVENTION

This invention relates generally to the field of Digital Television (DTV), also referred to as Advanced Television (ATV). More particularly, in certain preferred embodiments, this invention relates to a method and system for tuning an ATSC (the Federal Communication Commission's Advanced Television Systems Committee) compliant digital television for both PSIP (the ATSC's Program System Information Protocol) and MPEG 2 (Moving Picture Expert Group version 2 ) digital video broadcast format video.

BACKGROUND OF THE INVENTION

In the United States, digital television signals can be broadcast using either of two technical standards. The first is MPEG 2 which is mandatory. The second is PSIP which is an optional standard that supports enhanced features. The PSIP standard provides the ability to associate multiple channel frequencies with a single broadcaster for display in the channel guide. The MPEG 2 digital video broadcast standard provides no such capability. For MPEG 2 the major channel displayed in the program guide corresponds directly with the physical channel number (frequency) used to broadcast the digital television signal. For PSIP broadcasts, programming can be broadcast on multiple frequencies yet displayed as a collection of major and minor channels in the program guide for ease of selection by the user. That is, for PSIP, a virtual channel number can represent the physical channel carrying the broadcast whereas in MPEG 2, the concept of a virtual channel does not exist—the major channel number is always the physical channel number associated with a broadcast frequency.

These two differing standards create a challenge for design of the digital television receiver. Since each format PSIP and MPEG uses its own Program Specific Information tables as defined in the respective specifications, the television receiver device must be able to distinguish between the two formats and use the Program Specific Information so that the receiver can receive both the PSIP and MPEG standard program formats in a manner which is transparent to the user.

SUMMARY OF THE INVENTION

The present invention relates generally to digital television. Objects, advantages and features of the invention will become apparent to those skilled in the art upon consideration of the following detailed description of the invention.

In one embodiment consistent with the present invention a method of tuning a digital television receiver includes receiving a command to tune to a major channel and a minor channel; determining whether the major channel is PSIP compliant, and if so: looking up a TSID corresponding to the major channel; looking up a physical channel corresponding to the TSID; tuning a tuner to the physical channel; and determining if the physical channel carries the major and minor channel, and if so, remaining tuned to the physical channel.

In another embodiment consistent with the present invention, a method of storing channel information in a digital television receiver, includes tuning to a selected physical channel; reading Program Specific Information on the selected physical channel; storing an indication of whether the physical channel is a PSIP compliant channel; if the selected physical channel is a PSIP compliant channel: storing a TSID corresponding to the selected physical channel; and storing a major channel corresponding to the selected physical channel.

In another embodiment consistent with the present invention, a method of autoprogramming channel information in a digital television receiver, includes for each of a plurality of N physical channels: tuning to a selected physical channel; reading Program Specific Information on the selected physical channel; storing an indication of whether the physical channel is a PSIP compliant channel; if the selected physical channel is a compliant PSIP channel: storing a TSID corresponding to the selected physical channel; and storing a major channel corresponding to the selected physical channel.

A device for tuning a digital television receiver consistent with another embodiment of the present invention includes a control module. A user module provides an interface to a user and sends commands to the control module to select a major and minor television channel. A tuner tunes to physical channels and produces a digital transport stream of packets. A database stores Program Specific Information from a currently tuned physical channel. A demultiplexer receives the transport stream and produces a demultiplexed data stream representing a tuned television channel. The control module includes program for: determining whether the major channel is PSIP compliant, and if so: looking up a TSID corresponding to the major channel; looking up a physical channel corresponding to the TSID; tuning a tuner to the physical channel; and determining if the physical channel carries the major and minor channel, and if so, remaining tuned to the physical channel.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5, which is made up of FIG. 5A, FIG. 5B, FIG. 5C

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Before describing the current invention in detail, it is useful to define several of the terms which will be used frequently herein. The term "physical channel" as used herein refers to a broadcast frequency used to transmit digital television programming. In the United States, 68 physical channels are utilized to broadcast digital television. These channels are numbered 2 through 69. The physical channel for broadcasting any particular program can vary from location to location so that the same program might be carried on a different physical channel depending upon the channel assignment available to local television station. The term "virtual channel" and "major channel" refer to identifiers which typically identify a network or source of programming material such as CBS, ABC, NBC, Fox, etc. The major channel or virtual channel is represented by a major channel number which is used by the television receiver to partially identify a television program. The term "minor channel" is a number which used in conjunction with the major channel number uniquely identifies a television program. For example, a user could tune to channel 2.4 which would indicate major channel 2 minor channel 4 and this channel would uniquely identify a television program. The term TSID or "Transport Stream Identifier" is a number which identifies a transport stream carried on a particular physical channel. The TSID to transport stream association is unique for each transport stream that carries PSIP information; but, it is not necessarily unique for MPEG 2 only transport streams. Thus, two different PSIP transport streams will not have the same TSID value, but two MPEG 2 only transport streams might. Moreover, a PSIP transport stream and an MPEG 2 transport stream might share the same TSID value.

A "program" is defined to generally mean the conventional meaning of a program in the television sense, but a program in digital television is made up of a collection of program elements such as audio elementary streams, video elementary streams, etc. A transport stream may contain several programs multiplexed together if the physical channel bandwidth will support it. For example, MPEG 2 channels 24.1 and 24.2 may share a single transport stream. Finally, a "Packet Identifier" or PID is used to identify each element (packet) in the transport stream with a particular program. Therefore, packets associated with a particular channel will always use a common PID. Each elementary stream is associated with a PID and this association is given by the Program Specific Information present in the transport stream (and stored in a database in the present invention for the currently tuned physical channel as will be explained later.)

Figure 1:
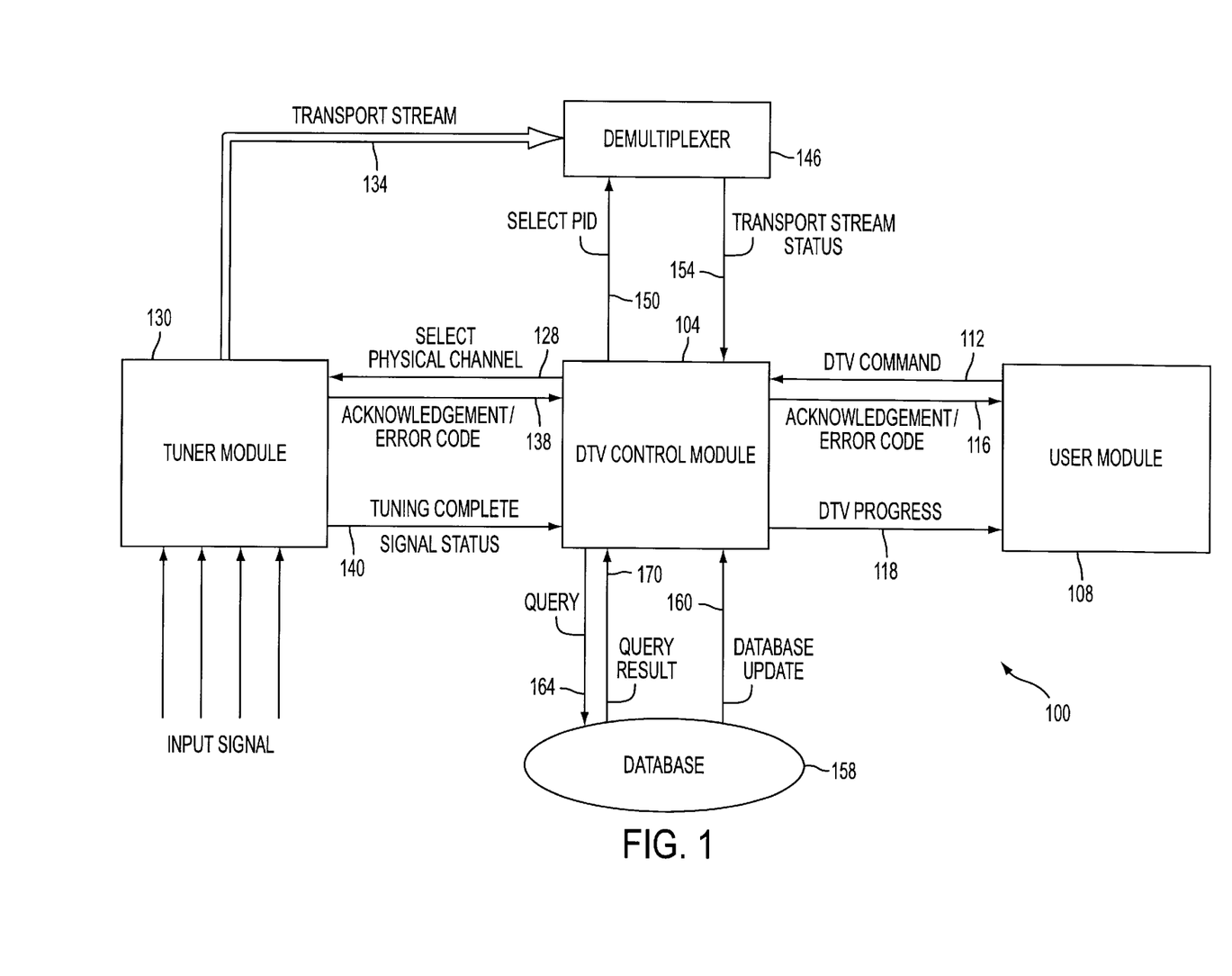
FIG. 1 is a block diagram of a tuning and autoprogramming system for a digital television receiver (or set top box) in accordance with an embodiment of the present invention.

Referring now to FIG. 1, the architecture of a DTV Control System in accordance with an embodiment of the present invention is shown as 100. This embodiment may form a part of a digital television set itself, a digital television adapter or a set-top box (STB), or any other device including DVD players and video cassette recorders which incorporate an internal tuning mechanism. The above architecture is used to tune digital television broadcasts. A DTV control module 104 which is based upon a programmed processor such as the Trimedia processor produced by Phillips, Inc. in the present embodiment, provides the intelligence for the DTV tuning system of the present invention. DTV control module 104 interfaces with a user module 108 which provides a user interface to the system 100.

User module 108 may incorporate a graphical user interface, remote controller interface and/or any other suitable mechanism for interfacing with a user. Commands issued by the user are translated by the user module 108 into a DTV command message 112 destined for the DTV control module 104. DTV control module 104 issues acknowledgments and error codes 116 back to the user module 108 along with a unique identifier code for each command 112 which is being acknowledged by an acknowledgment 116. This unique identifier is used so that if multiple commands are issued by the user, only the latest user command is used by the user module 108 to report status etc. to the user. Progress in completion of any commands by the DTV control module 104 is recorded as a DTV progress message 118 back to the user module 108. Such progress messages may be translated into reports to the user or may simply be used internally by the user module 108.

When the DTV control module 104 is instructed to select a physical channel by a command 112 from the user module 108 or by an internal routine, a physical channel select command 128 is sent to a tuner module 130. The tuner module receives input signals representing the physical channels 2 through 69 and demodulates the selected channel to produce a stream of packets of digital data referred to herein as transport stream 134. Each transport stream has a transport stream identifier or TSID, and each pakcet has a packet identifier or PID which correlates to a program component (or elementary stream).

Upon receipt of the physical channel selection command 128 the tuner module 130 acknowledges or sends an error code 138 back to the DTV control module 104 to indicate receipt of the command or an error. Upon completion of the process of selecting the particular physical channel and settling of all transients associated therewith, a tuning complete status signal 140 is sent from the tuner module 130 to the DTV control module 104.

In accord with the ATSC standard, the transport stream 134 may carry multiple programs residing on a single physical channel. These programs are demultiplexed in a demultiplexer 146 in accordance with a packet identifier (PID) selected by DTV control module 104 by a command issued on line 150. The packet identifier is determined by the digital television specification and can be programmed within the digital TV control module 104. Transport stream status information 154 is provided to the DTV control module 104 from demultiplexer 146.

One of the advanced features of digital television is the ability to provide program guide information for display by the user on his television set. This information is available in transport stream 134 as a part of the "Program Specific Information" tables for the currently tuned physical channel. As this Program Specific Information is received by demultiplexer 146 relevant data are stored in a database 158 for the currently tuned physical channel. When the database 158 has been fully updated for a newly tuned physical channel, an update signal 160 is transmitted from the database 158 to the digital TV control module 104 to provide the module with notification that the database 158 has been updated. DTV control module 104 may then issue queries 164 of database 158 and receive query results 170 from the database 158 to ascertain information about the currently tuned physical channel. Whenever a new physical channel is tuned by the tuner module 130 the database 158 is reset and repopulated with data from the newly tuned physical channel's Program Specific Information tables.

Figure 2:
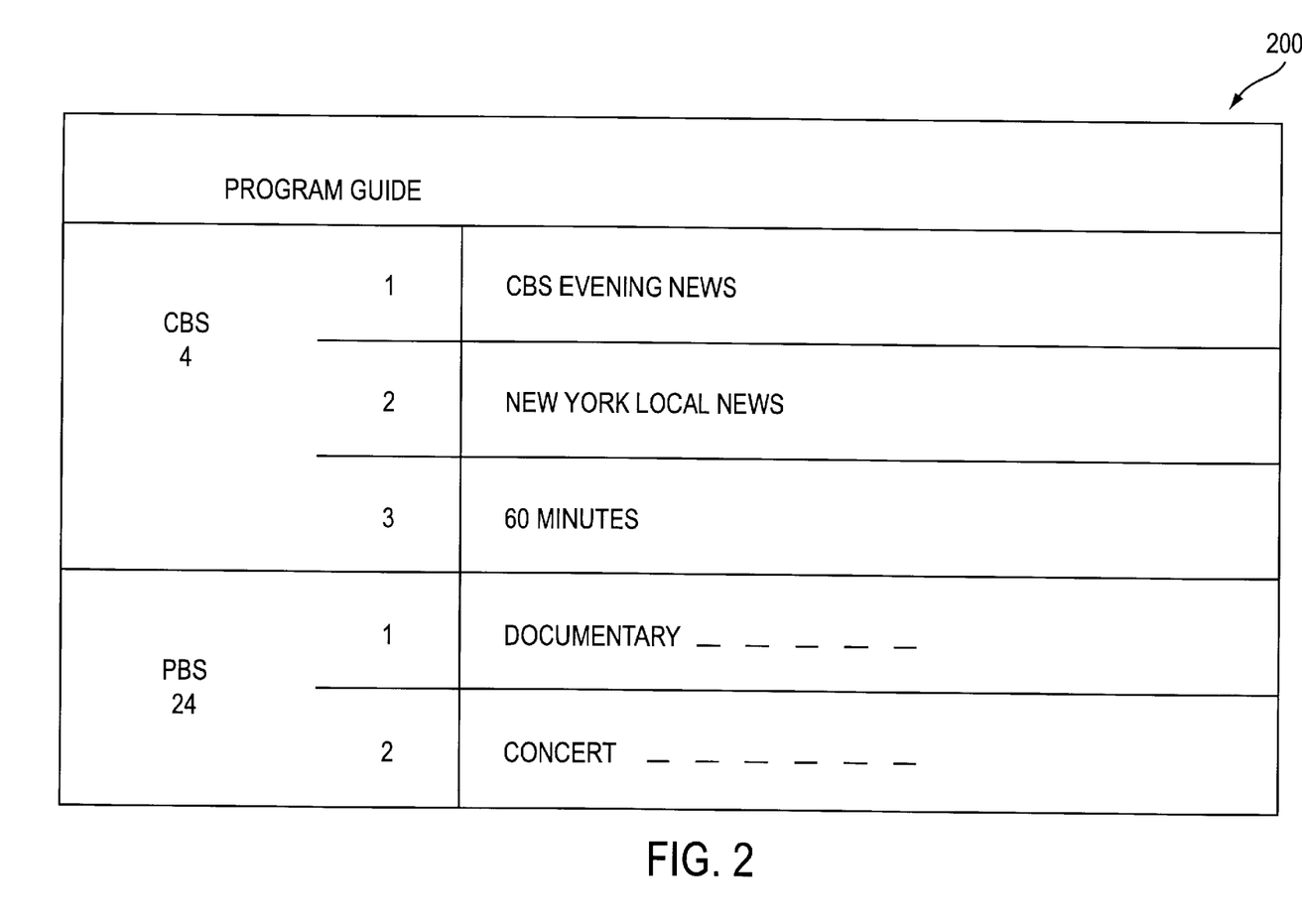
FIG. 2 is an illustrative simplified programming guide.

Referring to FIG. 2, a simple example of a program guide as might be displayed on the user's television set is illustrated as 200. The first block of programs shown as CBS 4 represent a collection of minor channels 1, 2 and 3 associated with three different television programs all of which use virtual channel or major channel 4. The second collection of programs referred to as PBS 24 show two programs which are associated with two minor channels forming a part of major channel 24.

By way of example, when any one of minor channels 1, 2 or 3 of major channel 4 is tuned by the tuner module 130 and demultiplexer 146, the database 158 captures the transient information associated with the tuned physical channel. In the case of major channel 4, in this example assume major channel 4 is a PSIP channel with data shown in TABLE 1. In addition to including television show name, rating, closed captioning information as well as a description of the programming and other useful information, the Program Specific Information includes the information shown in TABLE 1 which relate major plus minor channel to a physical channel and a TSID. Since three different physical channels are associated with the major channel (virtual channel) 4, this is clearly a PSIP format broadcast stream. Only one program is present on this physical channel, and it is uniquely identified within the transport stream by the TSID and the PID obtained from the Program Specific Information stored in the database 158 for the currently tuned channel.

TABLE 1

DATABASE DATA/TRANSPORT STREAM SYSTEM DATA

| MAJOR CHANNEL | MINOR CHANNEL | PHYSICAL CHANNEL | TSID |
|---|---|---|---|
| 4 | 1 | 57 | 381 |
| 4 | 2 | 16 | 101 |
| 4 | 3 | 12 | 122 |

In order to tune to any given television program as identified by major plus minor channel (either by direct selection by the user or by incrementing up or down to the next channel or any other mechanism which ultimately delivers a major plus minor channel to the DTV control module 104) the DTV control module 104 associates the major channel and minor channel with a physical channel and packet ID (PID) in order to tune to the channel. The present invention utilizes an autoprogramming function to populate three static tables which are stored in non-volatile memory (for example flash memory) so that during the channel selection process the digital TV control module 104 may ascertain how to tune tuner module 130 to any particular selected program.

Figure 3:
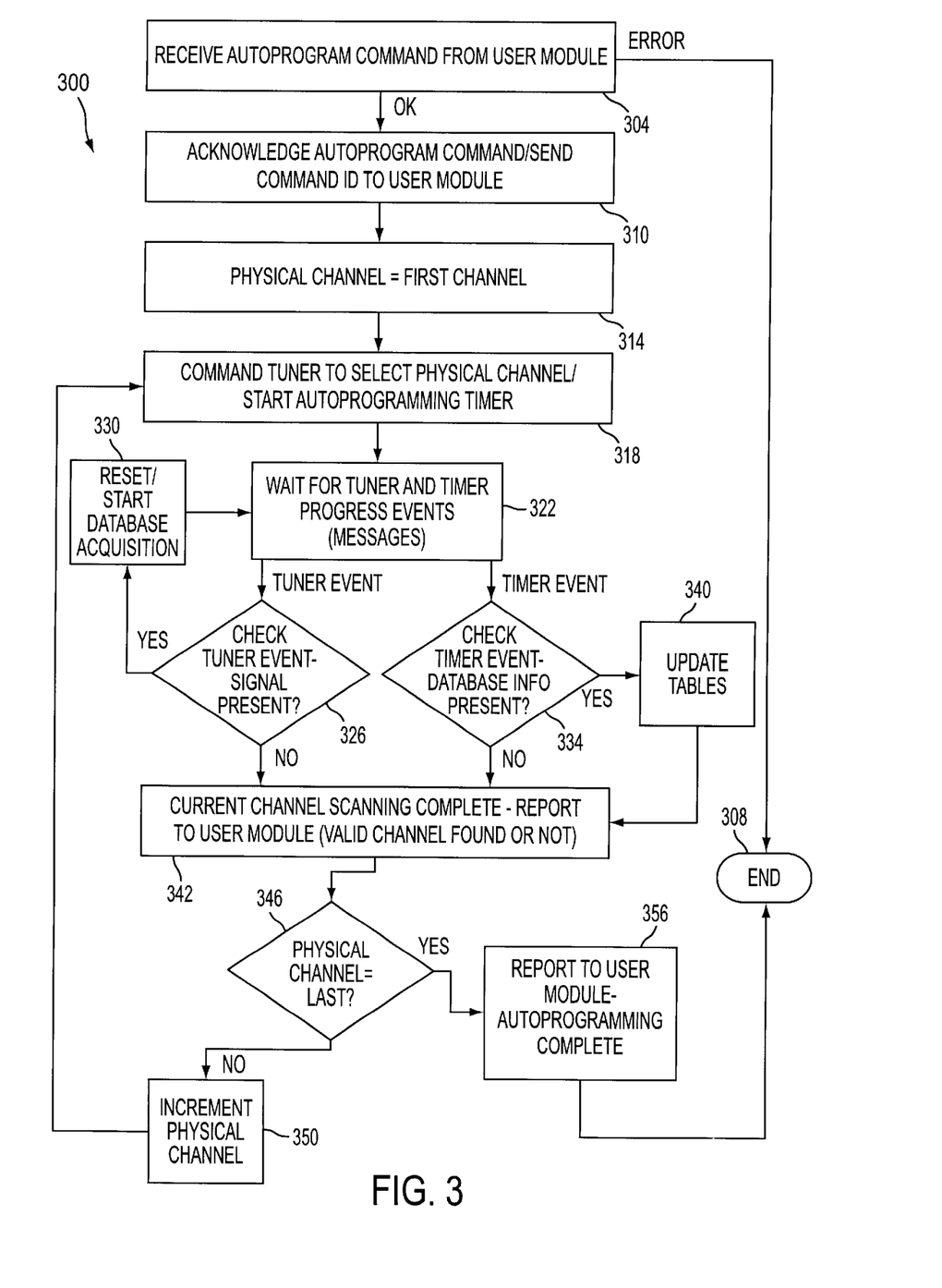
FIG. 3 is a flow chart of an autoprogramming process consistent with certain embodiments of the present invention.

The static information (which rarely changes except during an autoprogramming process) stored in the non-volatile memory in accordance with one embodiment of the invention is stored in three tables shown as TABLES 2, 3 and 4 below and referred to respectively as the PSIP/MPEG Table, the Major/TSID Table and the Physical/TSID Table respectively. Collectively, these tables are referred to as the autoprogramming tables. The autoprogramming process in accordance with an embodiment of the present invention is illustrated in FIG. 3 as process 300. This process generally is a process for systematically stepping through each of the physical channels, tuning to the physical channels one by one and extracting from the resulting database information for the currently tuned physical channel (including channel major channel information and TSID information associated with the major channel) from the Program Specific Information tables in the transport stream 134. This information is stored in TABLES 3 and 4 for all PSIP channels, with TABLE 2 providing a directory of PSIP vs. MPEG channels. Recall that for MPEG channels, the major channel number is identical to the physical channel and can be tuned directly.

TABLE 2

PSIP/MPEG TABLE

| MAJOR CHANNEL | PSIP CHANNEL? |
|---|---|
| 4 | YES |
| 24 | NO |
| 29 | YES |
| 39 | NO |
| 45 | NO |
| 56 | NO |

TABLE 3

MAJOR/TSID TABLE

| MAJOR CHANNEL | TSID |
|---|---|
| 4 | 381 |
| 29 | 136 |

TABLE 4

PHYSICAL/TSID TABLE

| PHYSICAL CHANNEL | TSID |
|---|---|
| 12 | 122 |
| 16 | 101 |
| 19 | 136 |
| 57 | 381 |

Referring now to FIG. 3, the autoprogramming process begins at 304 upon receipt of an autoprogram command by the DTV control module 104 issued as a DTV command 112 from user module 108 in response to a user command to autoprogram or another event which automatically triggers an autoprogram process. In the event an error occurs at 304 the process terminates at 308 without further action except possibly issuance of an error message. Assuming the command is received and can be executed at 304 an acknowledge message 116 along with a unique command ID is sent from DTV control module 104 to user module 108 as acknowledgment 116 at 310.

At 314 the physical channel is set to the first physical channel (typically 2) and control passes to 318. At 318 the DTV control module 104 sends a select physical channel command 128 to tuner module 130 to select the currently selected physical channel and start an autoprogramming timer. Control then passes to 322 where the DTV control module 104 awaits either a tuner or a timer event message. Under normal circumstances, a tuner event (a message 140 indicating completion of tuning to the selected physical channel by tuner 130) will occur before the autoprogramming timer times out so that a tuner event is detected at 326 via a tuning complete status signal 140. Upon receipt of the tuner event at 326 the database 158 is cleared with a reset and acquisition of new database information for database 158 is commenced at 330. When the autoprogramming timer expires at 334 enough time has passed for both the tuner 130 to acquire the selected physical channel and the new information to have been completely acquired at 330. At 334 the timer event has completed and the database information is normally present. Thus, TABLES 2, 3 and 4 can be updated at 340.

Assuming a valid physical channel was found and the tables were properly updated at 340 the process of scanning the current physical channel is completed at 342 and an appropriate report is set as a DTV progress message 118 from the DTV control module 104 to the user module 108. In the event a signal was not found at 326 (i.e. no physical channel information was present on the currently tuned physical channel at 326) or no database information was found at the end of the autoprogramming timer at 334 the tables are not updated at 340 and an error report is generated at 342 indicating to the user module 108 that a valid channel was not found. If the current physical channel is not the last physical channel (usually channel 69) at 346 the physical channel is incremented at 350 and control returns to 318 where the tuner selects the next physical channel and repeats the process. If the physical channel was the last physical channel at 346 a report is generated to user module 108 indicating that the autoprogramming process is complete at 356 and the process terminates at 308.

Figure 4:
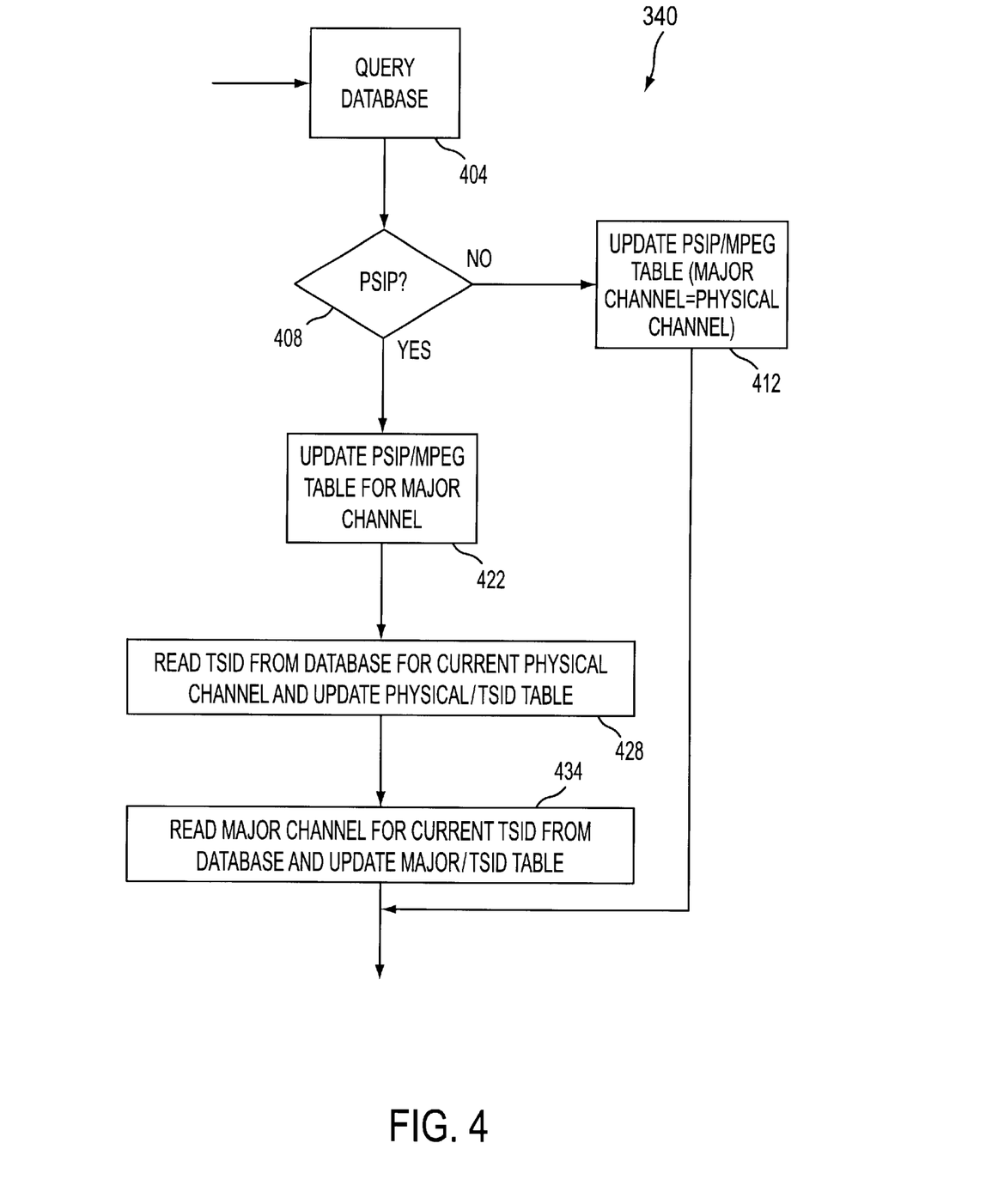
FIG. 4 is a flow chart of a process for updating the autoprogramming tables in accordance with an embodiment of the present invention.

Referring now to FIG. 4, stage 340 of updating the TABLES 2 through 4 is described in greater detail. This process begins with querying of database 158 at 404 and first determining if the currently tuned physical channel is a PSIP channel at 408. If not, the PSIP/MPEG Table (TABLE 2) is updated by indicating that the currently selected channel is not a PSIP channel at 412. In this case, by knowing that the channel is not a PSIP channel it must be an MPEG channel therefore the major channel is equal to the physical channel, and further population of TABLES 3 and 4 is not needed.

In the event the currently selected physical channel is a PSIP channel at 408 the PSIP/MPEG Table (TABLE 2) is updated to indicate that the current major channel is in fact a PSIP channel at 422. Control then passes to 428 where the TSID is readfrom the database 158 for the currentlytuned physical channel and the Physical/TSID Table (TABLE 4) is updated. Control then passes to 434 where the major channel for the current TSID is read from the database 158 and the Major/TSID Table (TABLE 3) is updated. When 412 or 434 is completed, stage 340 has been completed and control passes to 342 of FIG. 3.

Those skilled in the art will recognize that the relationship between TSID and major channel as listed in TABLE 3 is not a unique one-to-one relationship. In fact, the relationship from major channel to TSID may be a one-to-many relationship since a major channel as shown in TABLE 1 may have, for example, three physical channels and TSID's associated with major channel 4. For purposes of the present invention, it is only important that one valid relationship is stored in non-volatile memory which relates the major channel to one of the TSID's for the major channel. As the process of FIG. 3 is implemented, it makes no difference whether or not the Major/TSID Table (TABLE 3) is updated when a new TSID is encountered for an existing major channel or whether the originally stored major channel to TSID relationship is retained for those major channels having multiple TSID's. It is only important that one valid major channel TSID relationship be stored in TABLE 3.

In the example shown in TABLE 1the autoprogramming process for major channel 4 proceeds by first determining that the major channel 4 is a PSIP channel and indicating adjacent the major channel 4 entry in TABLE 2 that it is a PSIP channel. Major channel 4 will first be encountered in the autoprogramming process upon tuning to physical channel 12. Thus, the TSID for physical channel 12 will be entered into TABLE 4. Next, TABLE 3 will be updated with a TSID of 122 from TABLE 1 in TABLE 3. When physical channel 16 is encountered, it is again determined to be a PSIP channel associated with major channel 4 which is already in TABLE 2. TABLE 4 is then updated with a TSID of 101 for physical channel 16 and TABLE 3 may be updated from 122 as the TSID associated with major channel 4 to 101 as the TSID associated with major channel 4. When the physical channel is finally tuned to physical channel 57 TABLE 4 is updated to associate 381 as the TSID for physical channel 57 and TABLE 3 is updated to change the TSID associated with major channel 4 to 381. In the above scenario, TABLE 3 could equally well have remained TSID 122 associated with major channel 4. As previously mentioned, it is only necessary that there be a correct index from the TSID to the correct major channel.

Once all of the above information is stored in TABLES 2, 3 and 4the tuning system 100 of FIG. 1 can be used to tune any desired program as selected from a program guide such as FIG. 2 or alternatively selected by incrementing the channel up or down or using any other selection technique. The information stored in TABLES 2, 3 and 4 is assumed by the system to be static information and is stored in non-volatile memory. In the event of a change in any of this information, a new autoprogramming sequence should be instituted to update the information in order for the receiver to be able to continue to correctly receive the television programming. Referring now to FIG. 5, which is broken into FIGS. 5A, 5B, 5C and 5D, the channel selection process in accordance with an embodiment of the present invention is illustrated. In this process, starting at FIG. 5A, the DTV control module 104 receives channel selection information in the form of the DTV command 112 from user module 108. This channel selection command includes major and minor channel numbers. When this channel information is received at 502 by the DTV control module 104 the DTV control module 104 checks the static non-volatile memory for TABLES 2, 3 and 4 to determine if the major channel selected is among those in the autoprogramming tables at 506. If not, the channel selection command is acknowledged with an acknowledgment which includes a command identifier and the user module 108 is notified by the DTV control module 104 that the command is invalid at 508. The process then terminates at 510.

If the major channel is in the autoprogramming tables at 506 control passes to 512 where TABLE 2 is consulted to determine if the major channel is a PSIP channel or an MPEG 2 channel at 512. If it is an MPEG 2 channel at 512 the physical channel is set equal to the major channel at 516 and control passes to 518. At 518 if the physical channel is equal to the current physical channel, at this point an acknowledgment 116 is returned to user module 108 along with an appropriate command identifier and a report that no acquisition is needed at 522. Control then passes to the process of FIG. 5B starting with the connector B. If at 518 the physical channel is not equal to the current physical channel, an acknowledgment message 116 is sent from the DTV control module 104 to the user module 108 along with a report that acquisition is needed in order to tune to the correct physical channel at 526. The tuner is then set for the correct physical channel at 528 and control again passes to connector B and the process of FIG. 5B.

At 530 a channel selection timer is started and control passes to 532 where a timer event or a database update event is awaited. In the event a database update event occurs first at 534 and the major plus minor channel is not found at 534 control returns to 532 until the channel selection timer event occurs. When the timer expires at 532 the timer event causes 538 to determine if the major plus minor is in the database 158. If the major plus minor channel is in the database at either 534 or 538 control passes to 540. In either event, at 540 the program packet identifiers are enabled so that the DTV control module 104 selects the appropriate packet identifier using 150 to extract the appropriate program from the transport stream 134. At 542 a report and command identifier is sent to the user module 108 with the report indicating that the channel selection is complete and the channel has been found. The channel selection process then terminates at 510. In the event the major plus minor channel is not present in the database 158 at 538 upon expiry of the channel selection timer, control passes to 546 where a report and command identifier is sent to the user module 108 from the DTV control module 104 indicating that the channel selection is complete but the channel was not found. The process then terminates at 510.

Figure 5A:
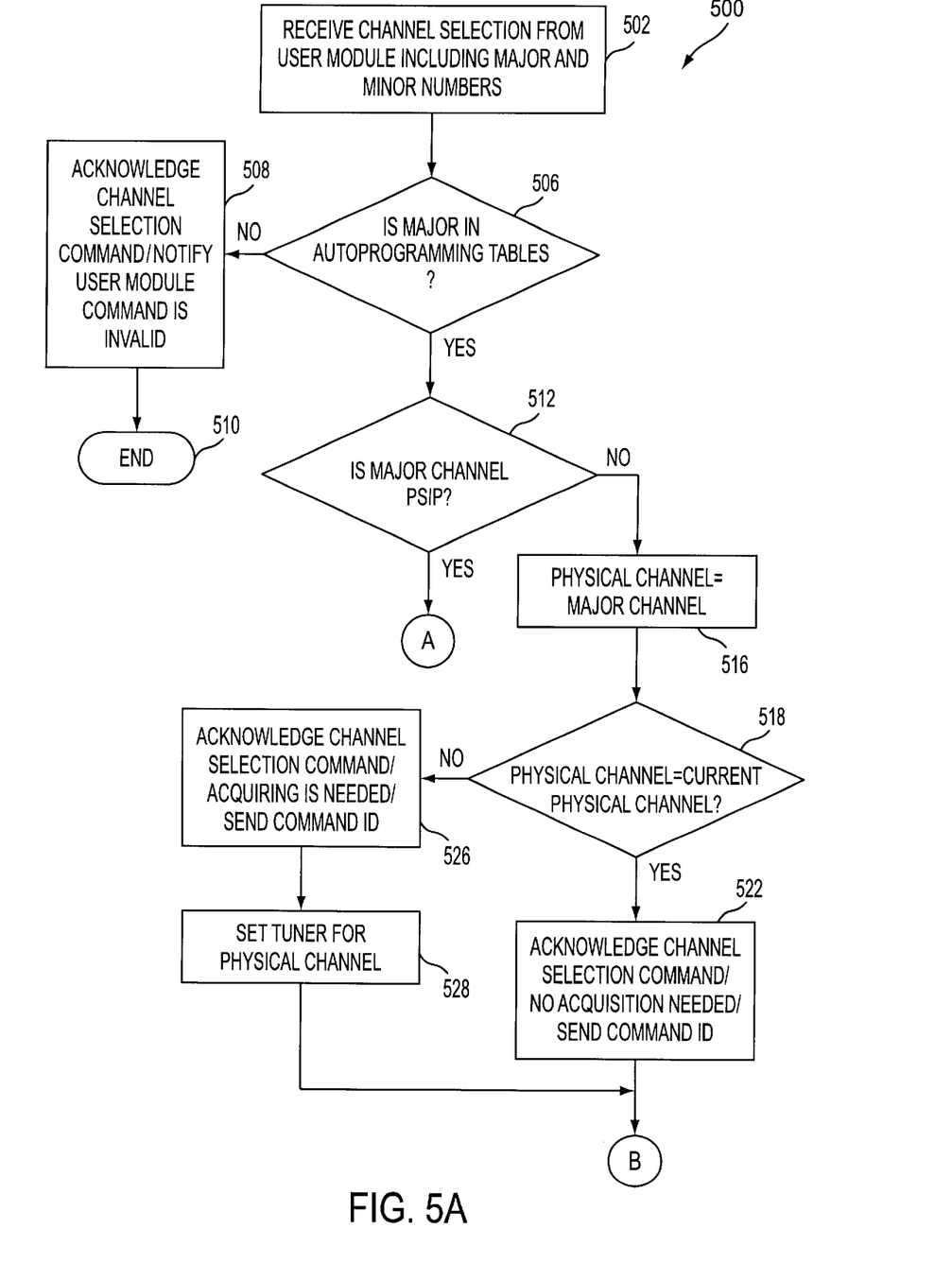
Figure 5B:
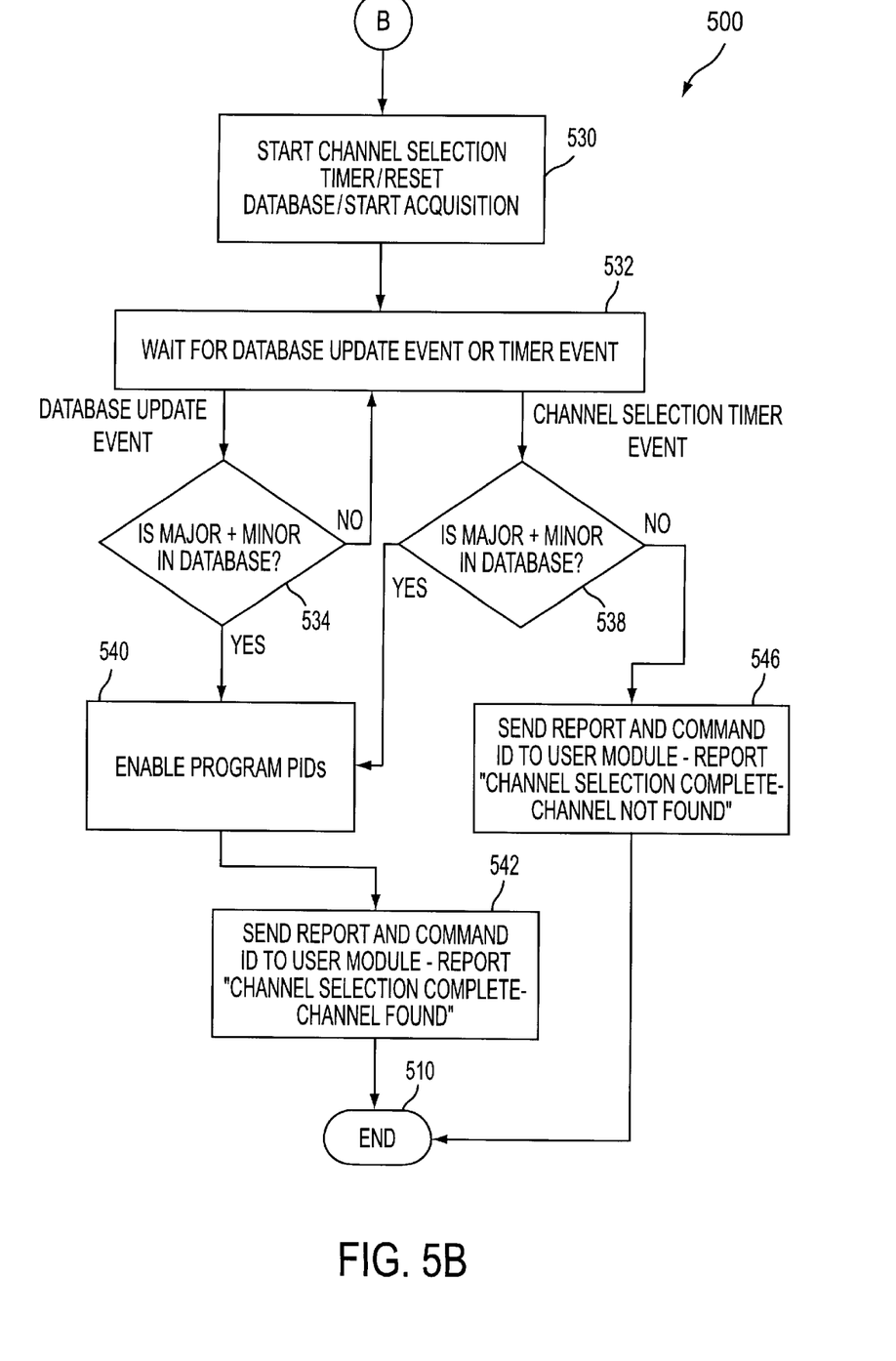
Figure 5C:
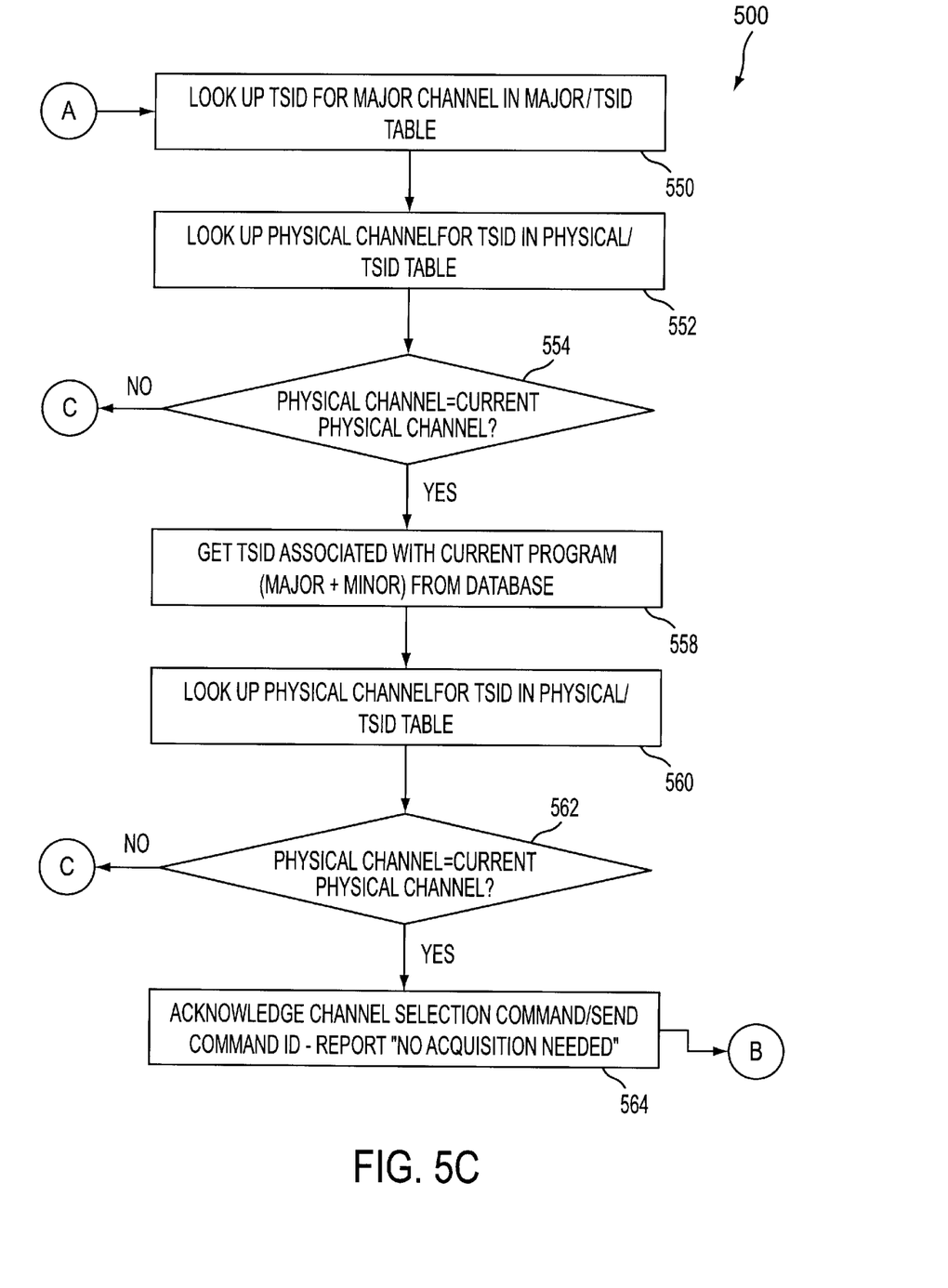
Figure 5D:
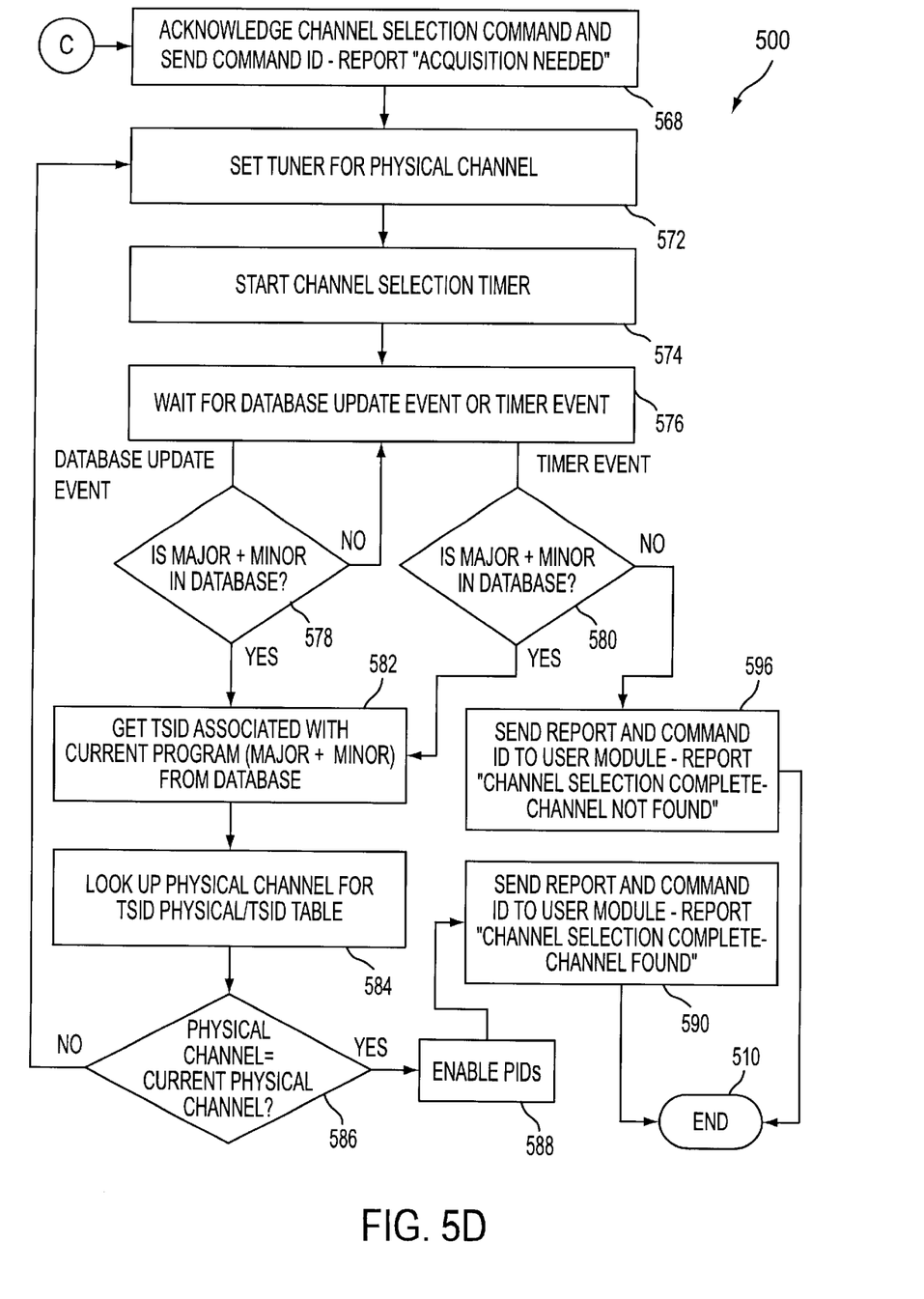
FIG. 5D is a flow chart of a channel selection process consistent with certain embodiments of the present invention.

Referring back to FIG. 5A, if the major channel is a PSIP channel at 512 control passes to the process of FIG. 5C beginning at connector A. At 550 the TSID is determined from the major channel using the Major/TSID Table (TABLE 3). Control then passes to 552 where the physical channel is looked up for the TSID using the Physical/TSID Table (TABLE 4). Control then passes to 554 which determines whether the physical channel is equal to the current physical channel. If not, the process of FIG. 5D is invoked as will be discussed later. If so, control passes to 558 where the TSID associated with the current program including both major and minor channels is obtained from the database 158. Since the current physical channel is the physical channel desired, the most accurate up-to-date information should currently be stored in database 158. Control then passes to 560 where the physical channel is determined for the TSID from the Physical/TSID Table (TABLE 4).

If the physical channel determined from the Physical/TSID Table in 560 is equal to the current physical channel at 562 the channel selection is acknowledged and the command ID is forwarded from the DTV control module 104 as an acknowledgment 116 to the user module 108 along with a report that no acquisition is needed at 564. Control then passes to the process of FIG. 5B at connector B. In the event the physical channel is not equal to the current physical channel at 562 control passes again to connector C of FIG. 5D.

Referring now to FIG. 5D, the process beginning with connector C is illustrated beginning with an acknowledgment message 116 which is sent from the DTV control module 104 to the user module 108 along with a command ID and a report that acquisition is needed to tune to the selected channel at 568. At 572 the tuner is set for the physical channel determined at either 552 or 560 of FIG. 5C. The channel selection timer is started at 574 and control passes to 576 where a database update event or a timer event is awaited.

When a database update event is received, and the selected major plus minor channel is not in the database 158 control returns to 576 to await another database update event or a timer event. In the event of a timer event at 580 if the major plus minor channel is now in the database 158 control passes to 582. Control also passes from 578 to 582 in the event the major plus minor channel is found in the database 158. Control then passes to 584 where the physical channel is determined for the TSID from the Physical/TSID Table. If the physical channel is not equal to the current physical channel at 586 control returns to 572 where the tuner is reset for the physical channel. If the physical channel is equal to the current physical channel at 586 the PID's are enabled for selection at 150 to extract the appropriate program from the transport stream 134 at 588. Control then passes to 590 where a report including a command identifier is sent from the DTV control module 104 to user module 108 along with a report that the channel selection is complete and the channel has been found at 590. The process then terminates at 510. module 104 to user module 108 along with a report that the channel selection is complete and the channel has been found at 590. The process then terminates at 510.

In the event at the end of the channel selection timer the major plus minor channel is not found in the database 158 at 580 a report and command ID is sent from the DTV control module 104 to the user module 108 at 596 indicating that the channel selection is complete, but the channel is not found. The process then terminates at 510.

In the above scenario, if the user was tuning to channel 4.1 instead of 4.2 physical channel 57 would have been the correct channel initially and an iteration of the tuning process would not have been necessary. In the event the user wished to tune to channel 24.1 the DTV control module 104 would ascertain from TABLE 2 that the major channel 24 is not a PSIP channel but is in fact an MPEG 2 channel. Thus, the physical channel is set equal to the major channel and physical channel 24 is tuned by the tuner module 130. The data stream then associated with minor channel 1 of major channel 24 is simply extracted from the transport stream 134 by a demultiplexer 146 using the appropriate PID in order to select the program associated with channel 24.1.

In accordance with the above invention, if the user wishes to tune, for example, to channel 4.2 the DTV control module 104 determines from the PSIP/MPEG Table that major channel 4 is a PSIP channel. The major channel is then determined from the Major/TSID Table to have a TSID of 381. TSID 381 is then determined from the physical TSID Table to be associated with physical channel 57. The tuner module 130 is thus directed by the DTV control module 104 to tune physical channel 57.

Once channel 57 is tuned, the DTV control module 104 determines from the database 158 that program material for minor channel 4.2 is not present. Recall that minor channel 4.2 as shown in TABLE 1 is physical channel 16 with TSID 101. However, since physical channel 57 is a part of major channel 4 all of the information of TABLE 1 is available in database 158 once the physical channel has been tuned to any of the physical channels associated with major channel 4. Thus, the DTV control module 104 is able to ascertain from the database 158 that channel 4.2 actually has a TSID of 101 and is associated with physical channel 16. Accordingly, the DTV control module 104 instructs tuner 130 to tune to physical channel 16. Upon completion of the tuner module 130 tuning to physical channel 16 the demultiplexer 146 is able to extract the program material associated with the packet identifier (PID) for major channel 4.2 from the transport stream 134 and the tuning process is complete.

Once the program is playing, the DTV control module 104 monitors the database 158 for any significant changes. Every time the content of database 158 is modified,: an update message is sent to the DTV control module 104. The DTV control module 104 then queries the database 158 and compares the new data with the old one. The DTV control module 104 then makes the appropriate changes (new elementary PIDs, new content rating, new caption descriptor, new event, etc . . .) and notifies the user module

108 if needed. The multiplexer 146 and/or turner module 130 also notify the DTV control module 104 in case there is any change in the input signal status (signal lost, bad synchronization, errors, etc.). If the signal is lost, the DTV control module 104 resets the database 158 notifies the user module 108 and waits for the signal to be acquired again or for the user to issue another DTV command 112.

Those skilled in the art will recognize that there are other mechanisms for implementing the processes described above. For example, rather than using 3 tables (TABLES 2 through 4) each having two columns, a single table as illustrated below as TABLE 5 can be utilized to carry all of the information of TABLES 2, 3 and 4 in a single table with four columns.

TABLE 5

AUTOPROGRAMMING TABLE (SECOND EMBODIMENT)

| MAJOR CHANNEL | PSIP? | TSID | PHYSICAL CHANNEL |
|---|---|---|---|
| 4 | YES | 122 | 12 |
| 4 | YES | 101 | 16 |
| 4 | YES | 381 | 57 |
| 24 | NO | — | 24 |
| 29 | YES | 136 | 19 |
| 39 | NO | — | 39 |
| 45 | NO | — | 45 |
| 56 | NO | — | 56 |

Those skilled in the art will recognize that the present invention has been described in terms of exemplary embodiments based upon use of a programmed processor forming a part of the DTV Control Module 104. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will also appreciate that the architecture disclosed herein is exemplary. Other architectures which divide the functionality of a module and/or combine the functionality of the modules will occur to those skilled in the art and are contemplated as equivalents to the presently disclosed architecture.

The present invention may be modified in many ways without departing from the present invention. For example, as disclosed above, the autoprogramming tables are only modified during the autoprogramming process. If any of the table values are changed after the last autoprogramming, the DTV control module 104 might not be able to tune correctly to the channel. The only message displayed in that case is "No Program". However, in an alternative embodiment, when tuning to such a modified physical channel where the signal is present, it is possible to detect inconsistencies between the autoprogramming tables and the current content of the database 158. It is then be possible, in some cases, to automatically modify the content of the autoprogramming tables, remove the outdated information and replace it with the updated information so that the change is transparent for the user. In other embodiments, a warning message can be displayed asking the user to autoprogram the channel list again in the event such a change is detected.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of tuning a digital television receiver, comprising:
   receiving a command to tune to a major channel and a minor channel;
   determining whether the major channel is PSIP compliant, and if so:
   looking up a TSID corresponding to the major channel;
   looking up a physical channel corresponding to the TSID;
   tuning a tuner to the physical channel;
   determining if the physical channel carries the major and minor channel, and
   if so, remaining tuned to the physical channel;
   if the physical channel does not carry the major and minor channel:
   determining from program specific information a TSID associated with the minor channel;
   looking up a physical channel associated with the minor channel using the TSID associated with the minor channel; and
   tuning the tuner to the physical channel associated with the minor channel.

2. The method of claim 1, wherein the command is received by a control module from a user module.

3. The method of claim 2, further comprising acknowledging the command from the user module using a command identifier associated with the command and reporting that acquisition of a new physical channel is needed.

4. The method of claim 1, wherein if the major channel is not PSIP compliant:
   setting the physical channel equal to the major channel;
   tuning the tuner to the major channel; and
   selecting a PID corresponding to the minor channel.

5. The method of claim 1, wherein the channel is determined to be a PSIP channel from a first lookup table, the TSID is looked up in a second lookup table and the physical channel is looked up in a third lookup table.

6. The method of claim 1, further comprising resetting a database and acquiring data to populate the database from program specific information when the database is tuned to the physical channel.

7. The method of claim 4, further comprising determining the presence or absence of the major and minor channel by examining the database for the presence or absence of data relating to the major and minor channel.

8. The method of claim 7, wherein the database is examined after expiration of a timer, wherein the timer expires after an adequate amount of time has passed for acquisition of the physical channel by the tuner and population of the database.

9. The method of claim 1, wherein the command is received by a control module from a user module.

10. The method of claim 8, further comprising acknowledging the command from the user module using a command identifier associated with the command.

11. The method of claim 1, further comprising selecting a program from a transport stream using a packet identifier associated with the program.

12. A method of tuning a digital television receiver, comprising:

receiving a command from a control module to a user module to tune to a major channel and a minor channel;

determining whether the major channel is PSIP compliant by reference to a first lookup table stored in non-volatile memory, and if so:

looking up a TSID corresponding to the major channel in a second lookup table stored in non-volatile memory;

looking up a physical channel in a third lookup table stored in non-volatile memory corresponding to the TSID;

tuning a tuner to the physical channel; and determining if the physical channel carries the major and minor channel, and if so, remaining tuned to the physical channel;

if the physical channel does not carry the major and minor channel:

determining from program specific information a TSID associated with the minor channel;

looking up a physical channel associated with the minor channel using the TSID associated with the minor channel; and tuning the tuner to the physical channel associated with the minor channel;

acknowledging the command from the user module using a command identifier associated with the command and reporting whether acquisition of a new physical channel is needed;

and, wherein if the major channel is not PSIP compliant:

setting the physical channel equal to the major channel;

tuning the tuner to the major channel; and selecting a PID corresponding to the minor channel.

13. The method of claim 12, further comprising resetting a database and acquiring data to populate the database from program specific information when the database is tuned to the physical channel.

14. The method of claim 13, further comprising determining the presence or absence of the major and minor channel by examining the database for the presence or absence of data relating to the major and minor channel.

15. The method of claim 14, wherein the database is examined after expiration of a timer, wherein the timer expires after an adequate amount of time has passed for acquisition of the physical channel by the tuner and population of the database.

16. The method of claim 14, further comprising acknowledging the command from the user module using a command identifier associated with the command.

17. The method of claim 15, further comprising selecting a program from a transport stream using a packet identifier associated with the program.

18. A device for tuning a digital television receiver, comprising:

a control module;

a user module which provides an interface to a user and sends commands to the control module to select a major and minor television channel;

a tuner which tunes to physical channels and produces a digital transport stream of packets;

a database storing program specific information from a currently tuned physical channel;

a demultiplexer receiving the transport stream and producing a demultiplexed data stream representing a tuned television channel;

wherein, the control module includes program means for:

determining whether the major channel is PSIP compliant, and if so:

looking up a TSID corresponding to the major channel;

looking up a physical channel corresponding to the TSID;

tuning a tuner to the physical channel;

determining if the physical channel carries the major and minor channel, and if so, remaining tuned to the physical channel;

if the physical channel does not carry the major and minor channel, the program means comprises means for:

determining from program specific information a TSID associated with the minor channel;

looking up a physical channel associated with the minor channel using the TSID associated with the minor channel; and tuning the tuner to the physical channel associated with the minor channel.

19. The device of claim 18, wherein if the major channel is not PSIP compliant, the program means comprises means for:

setting the physical channel equal to the major channel;

tuning the tuner to the major channel; and selecting a PID corresponding to the minor channel.

20. The device of claim 18, further comprising first, second and third lookup tables and wherein the channel is determined to be a PSIP channel from the first lookup table, the TSID is looked up in the second lookup table and the physical channel is looked up in the third lookup table.

21. The device of claim 18, wherein the control module resets the database and acquires data to populate the database from program specific information when the database is tuned to the physical channel.

22. The device of claim 21, wherein the presence or absence of the major and minor channel is determined by the control module by examining the database for the presence or absence of data relating to the major and minor channel.

23. The device of claim 22, wherein the database is examined after expiration of a timer, wherein the timer expires after an adequate amount of time has passed for acquisition of the physical channel by the tuner and population of the database.

24. The device of claim 18, wherein the program is selected from the transport stream by the demultiplexer using a packet identifier associated with the program.

* * * * *